US011159101B2

(12) United States Patent
Manser et al.

(10) Patent No.: US 11,159,101 B2
(45) Date of Patent: Oct. 26, 2021

(54) MODULAR INTERMEDIATE CIRCUIT OF A CONVERTER, CONVERTER CIRCUIT, ENERGY CONVERTER, AND VEHICLE

(71) Applicant: Bombardier Transportation GmbH, Berlin (DE)

(72) Inventors: Roland Manser, Untersiggenthal (CH); Dominik Reinhard, Zurich (CH); Reinhard Reichelt, Kuessaberg (DE)

(73) Assignee: Bombardier Transportation GmbH, Berlin (DE)

( * ) Notice: Subject to any disclaimer, the term of this patent is extended or adjusted under 35 U.S.C. 154(b) by 30 days.

(21) Appl. No.: 16/617,630

(22) PCT Filed: Jun. 1, 2018

(86) PCT No.: PCT/EP2018/064533
§ 371 (c)(1),
(2) Date: Feb. 10, 2020

(87) PCT Pub. No.: WO2018/220212
PCT Pub. Date: Dec. 6, 2018

(65) Prior Publication Data
US 2020/0169186 A1 May 28, 2020

(30) Foreign Application Priority Data
Jun. 2, 2017 (DE) ...................... 10 2017 209 456.7

(51) Int. Cl.
*B61C 3/00* (2006.01)
*H02M 7/00* (2006.01)
*H02M 7/68* (2006.01)

(52) U.S. Cl.
CPC .................. *H02M 7/68* (2013.01); *B61C 3/00* (2013.01); *H02M 7/003* (2013.01)

(58) Field of Classification Search
USPC .................................. 307/9.1, 10.1; 318/558
See application file for complete search history.

(56) References Cited

U.S. PATENT DOCUMENTS 10,000,122 B2    6/2018    Wu et al.
2002/0041504 A1    4/2002    Steinke
(Continued)

FOREIGN PATENT DOCUMENTS

CA           2565707 C       1/2006
CN          102522908 A      6/2012
(Continued)

OTHER PUBLICATIONS

Data Sheet for Borderline CC750 AC_15-25kV for regional trains (EMUs) with 15/25 kVac line voltage, https://search-ext.abb.com/library/Download.aspx?DocumentID=3BHS262330%20ZAB%20E08&LanguageCode=en&DocumentPartId=&Action=Launch, 2018, Downloaded 2020.

(Continued)

*Primary Examiner* — Toan T Vu
*Assistant Examiner* — Xuan Ly
(74) *Attorney, Agent, or Firm* — The Webb Law Firm

(57) ABSTRACT

A modular intermediate circuit for a power converter has at least two or more intermediate circuit capacitor modules connected in parallel and in a chain, each intermediate circuit capacitor module having a first terminal, a second terminal, and at least one first intermediate circuit capacitor, which is electrically connected with the first terminal and the second terminal. First terminals of the intermediate circuit capacitor modules each following immediately one after another in the chain are connected in each case through a first low-resistance, high-inductance connection and a first high-resistance, low-inductance connection that is connected in parallel thereto. Second terminals of the interme- (Continued)

diate circuit capacitor modules each following immediately one after another in the chain are connected in each case through a second low-resistance, high-inductance connection and a second high-resistance, low-inductance connection that is connected in parallel thereto. A converter circuit, an energy converter, and a vehicle are also disclosed.

16 Claims, 8 Drawing Sheets

(56) References Cited

U.S. PATENT DOCUMENTS

| | | |
|---|---|---|
| 2010/0034001 A1 | 2/2010 | Dommaschk et al. |
| 2012/0007535 A1* | 1/2012 | Jansson ............... H05K 1/144 |
| | | 318/558 |
| 2014/0077611 A1 | 3/2014 | Young et al. |

FOREIGN PATENT DOCUMENTS

| | | |
|---|---|---|
| DE | 69209093 T2 | 10/1996 |
| DE | 102013109940 A1 | 3/2014 |
| EP | 0619048 B1 | 3/1996 |
| EP | 2403323 A1 | 1/2012 |
| EP | 2927044 A1 | 10/2015 |
| RU | 2344535 C2 | 1/2009 |

OTHER PUBLICATIONS

Frisch et al., "Power Module with Additional Low Inductive Current Path", Proceedings—6th International Conference on Integrated Power Electronics Systems, 2010, pp. 273-278, VDE—Verlag, Berlin, Germany.

* cited by examiner

MODULAR INTERMEDIATE CIRCUIT OF A CONVERTER, CONVERTER CIRCUIT, ENERGY CONVERTER, AND VEHICLE

CROSS-REFERENCE TO RELATED APPLICATIONS

This application is the United States national phase of International Application No. PCT/EP2018/064533 filed Jun. 1, 2018, and claims priority to German Patent Application No. 10 2017 209 456.7 filed Jun. 2, 2017, the disclosures of which are hereby incorporated by reference in their entirety.

BACKGROUND OF THE INVENTION

Field of the Invention

The invention is in the field of power electronics, in particular that of power converters, and relates to the construction of a phase module for power converters and a converter. The invention also relates to a vehicle with a converter.

Description of the Related Art

Converters serve to convert alternating voltage and alternating current, this conversion involving adapting the characteristic properties such as voltage amplitude and frequency. A converter can have an intermediate circuit. It serves as a temporary storage and as an electrical buffer. Voltage and current are both converted in power converters.

Converters are used, for example, for drives of variable-speed electric motors. These are found in vehicles, especially in rail vehicles such as streetcars, electric locomotives, or high-speed trains. The vehicle taps the voltage through an overhead contact wire or a third rail, for example. This voltage is then adapted in the converter for the electrical drive.

Electric motors are used in the same way as dynamos to produce electric current from kinetic energy, for example as an electric vehicle is braking. The converter typically acts in both directions.

Converters can have phase modules with controllable semiconductor devices, for example IGBTs (insulated-gate bipolar transistor). By means of a frequented control, a phase current is generated in the phase module. This phase current can then drive an electric motor, for example.

Power converter modules consist of large arrangements of power converter units, wherein each power converter unit is connected to the intermediate circuit. Long connections to the intermediate circuit produce high inductance and, in connection with this, a power loss.

SUMMARY OF THE INVENTION

The objective of the invention is to improve the construction of the converter.

This objective is achieved by a modular intermediate circuit for a power converter. This objective is further achieved by a converter circuit, an energy converter, and a vehicle, in particular a rail vehicle.

A modular intermediate circuit for a power converter is proposed with at least two or more intermediate circuit capacitor modules connected in parallel and in a chain, each intermediate circuit capacitor module having a first terminal, a second terminal, and at least one first intermediate circuit capacitor, which is electrically connected with the first terminal and the second terminal, the first terminals of the intermediate circuit capacitor modules each following immediately one after another in the chain being connected in each case through a first low-resistance, high-inductance connection and a first high-resistance, low-inductance connection that is connected in parallel thereto, and the second terminals of the intermediate circuit capacitor modules each following immediately one after another in the chain being connected in each case through a second low-resistance, high-inductance connection and a second high-resistance, low-inductance connection that is connected in parallel thereto. Thereby, the first low-resistance, high-inductance connection and the second low-resistance, high-inductance connection each have a lower ohmic resistance and a higher inductance than the first high-resistance, low-inductance connection and the second high-resistance, low-inductance connection, respectively.

In this context, modular means that the intermediate circuit of the power converter has multiple individual components, the components being, in particular, intermediate circuit capacitors, intermediate circuit capacitor modules, and corresponding connections, which are put together into a common intermediate circuit.

A low-resistance connection is understood to mean, in particular, a connection that has a lower resistance than a high-resistance connection. However, the low-resistance connection preferably has a resistance between 10µΩ and 1Ω, while the high-resistance connection preferably has a resistance between 100Ω and 10 MΩ.

A low-inductance connection is understood to mean, in particular, a connection that has a lower inductance than a high-inductance connection. However, the low-inductance connection preferably has an inductance between 1 nH and 100 µH, while the high-inductance connection preferably has an inductance between 10 mH and 10 H.

Intermediate circuits of converters usually have electrical capacitors incorporated into them. At high currents or high power density of the converter, high current carrying capacity with simultaneously low self-inductance of the intermediate circuit capacitor can be advantageous for efficiency. A low equivalent series resistance (ESR) and a low equivalent series inductance (ESL) are requirements for good efficiency. A low-inductance connection of the intermediate circuit capacitor to the switching device can also lead to an increase in efficiency.

Since the modular intermediate circuit can be designed for high currents of multiple hundred to over one thousand amps, electrical conductors have inductances that depend on the magnetic permeability of the conductor material, the conductor cross section, and the size of the conductor loop. These inductances are parasitic, and it is advantageous to minimize them. In particular, the inductances are unintentionally introduced into the intermediate circuit by a coil, for example, or something similar.

According to one embodiment, the intermediate circuit capacitor module has in each case a switching device that is connected, or connectable, in parallel with it. The switching devices are in each case advantageously associated with one intermediate circuit capacitor module and directly connected in parallel with it. Switching devices can have at least one first and one second DC terminal, so that these terminals can be connected in parallel with the first and the second terminal of the intermediate circuit capacitor module.

According to one embodiment, the switching device has at least one or more AC terminals. The switching device is operated in such a way that a direct voltage across its DC terminals is produced into an alternating voltage at its AC terminal(s). According to one embodiment, the switching device can be operated in both directions, that is, an alternating voltage can also be converted into a direct voltage.

Each intermediate circuit capacitor module has at least one capacitor. The capacitor acts as an intermediate circuit capacitor to a switching device. During a switching operation of the switching device, the current in the capacitor changes. Therefore, it is part of the commutation circuit. The intermediate circuit capacitor is also referred to as a commutation capacitor.

In an operating state of a power converter with a modular intermediate circuit, there can be, between the first low-resistance, high-inductance connection and the second low-resistance, high-inductance connection, a direct voltage, each such direct voltage feeding the switching devices. The switching devices typically have an AC output, wherein, by corresponding control of the switching devices, an alternating voltage is produced from the direct voltage at the AC-output.

In another operating state of a power converter with a modular intermediate circuit, a direct voltage between the first low-resistance, high-inductance connection and the second low-resistance, high-inductance connection can be produced by the switching devices having an AC input and by producing the direct voltage from the alternating voltage at the AC-input by means of a corresponding control of the switching devices.

In one of these operating states, the intermediate circuit associated with the respective switching device acts as an electrical buffer, in particular the intermediate circuit capacitor acts as a temporary electrical storage. Therefore, the capacitance and the voltage class of the intermediate circuit capacitor module, or of the intermediate circuit capacitor must be adapted to the possible voltages and currents in an operating state of the power converter.

According to one embodiment, the voltage across the first terminal of an intermediate circuit capacitor module and the second terminal of an intermediate circuit capacitor module in an operating state is at least 1 kV or at least 3 kV. Therefore, the intermediate circuit is designed for voltages of at least 1 kV or at least 3 kV across the first terminal of an intermediate circuit capacitor module and the second terminal of an intermediate circuit capacitor module.

Each intermediate circuit capacitor module has at least one intermediate circuit capacitor. In addition, the intermediate circuit capacitor module can have more capacitors, typically connected in parallel with the first intermediate circuit capacitor. Typical capacitances of the intermediate circuit capacitor module lie in the range from a few hundred microfarads to more than 1,000 microfarads, and can be selected depending on the voltage in the intermediate circuit. For example, the capacitance can be 400 µF for 3.6 kV, 700 µF for 2.8 kV, 1,600 µF for 1.8 kV, or 9,000 µF for 750V. These discreet values only result from the typical target values in the manufacture of capacitors, and the values are not limited to them. The total capacitance is determined by one or more capacitors, connected in parallel, in the intermediate circuit capacitor module.

According to one embodiment, at least one of the intermediate circuit capacitor modules additionally has a second intermediate circuit capacitor, that is connected in parallel with the first intermediate circuit capacitor. In particular, multiple or all intermediate circuit capacitor modules can additionally have a second intermediate circuit capacitor. Different intermediate circuit capacitors can be used and combined in the circuit.

According to one embodiment, the intermediate circuit capacitor module has a self-inductance (ESL) of less than 100 nH or less than 50 nH.

The inductances of the first terminals and second terminals of each intermediate circuit capacitor module, each of which is provided to be connected in parallel with a switching device, are determined, inter alia, by the lengths of the electric lines or the sizes of the resulting conductor loops. The bigger the conductor loops, the higher the inductances. Therefore, the intermediate circuit capacitor modules should be connected spatially as close as possible to the respective switching device.

According to one embodiment, for each intermediate circuit capacitor module at least one switching device is provided, which can be connected in parallel with the terminals of the respective intermediate circuit capacitor module. In particular, it is also possible for groups of parallel switching devices to be connected in parallel with the terminals of the respective intermediate circuit capacitor module. The groups of switching devices can be connected, for example, in the form of a full bridge or a half bridge.

According to one embodiment, the groups of switching devices are arranged in a power phase module. The power phase module can be used to convert direct current into alternating current or alternating current into direct current in a modularly structured converter. In the converter, multiple power phase modules can be operated in parallel, independently of one another, or in an interdependent manner. The power phase modules are compact and can be arranged next to one another in a space-saving manner in the modular converter. The power phase module is advantageously replaceable.

According to one embodiment, each power phase module is associated with exactly one intermediate circuit capacitor module, and vice versa. This also means that each switching device is associated with exactly one intermediate circuit capacitor module.

According to one embodiment, the switching device has at least one of the following electronic components: a diode, a power MOSFET, and an IGBT. In particular, groups of switching devices can have multiple diode or IGBT half bridges or full bridges.

According to one embodiment, as direct voltage is converted into alternating voltage the switching device produces a frequency, or specifies a frequency, with which the direct current is converted into an alternating current having just this frequency. To accomplish this, the switching device can have a controller, in particular a gate controller, or it can be connected with a controller. According to one embodiment, the power phase module, in particular the switching device, has one or more terminals of a controller to control the one or more switching devices. The control can be performed through electrical signals, carried over copper wires, for example, or through optical signals, carried over optical fibers, for example.

The low-resistance, high-inductance connection has a higher inductance than the high-resistance, low-inductance connection. According to one embodiment, the inductance is essentially determined by the size of the conductor loop at high voltages and currents and by the conductivity and the cross section of the conductor. The size of the conductor loop is predetermined by the mechanical implementation of the modular intermediate circuit.

According to one embodiment, the inductance of the first low-resistance, high-inductance connections and the second low-resistance, high-inductance connections is higher by a factor of at least 2 or by a factor of at least 5 than that of the first high-resistance, low-inductance connections and the second high-resistance, low-inductance connections.

According to one embodiment, the inductances and ohmic resistances of the first high-resistance, low-inductance connections and those of the second high-resistance, low-inductance connections are essentially identical. Likewise, the inductances and ohmic resistances of the first low-resistance, high-inductance connections and those of the second low-resistance, high-inductance connections are essentially identical. Therefore, the modular intermediate circuit advantageously has a symmetry.

The modular construction of the modular intermediate circuit allows the connection of further identical or almost identical intermediate circuit capacitor modules which are connected in a chain to one another and in parallel. According to one embodiment, the modular intermediate circuit has three intermediate circuit capacitor modules and the three intermediate circuit capacitor modules are connected in parallel and in a chain. The modular intermediate circuit can additionally be expandable by other intermediate circuit capacitor modules.

According to one embodiment, the modular intermediate circuit forms a chain conductor. The chain conductor is put together from identical quadrupoles connected in a chain, and a quadrupole corresponds to a module of the intermediate circuit. A possible equivalent circuit diagram of the quadrupole is formed by a low-resistance, high-inductance R-L component connected in series with the quadrupole and, connected in parallel with it, a high-resistance, low-inductance R-L component, and a C component connected in parallel with the quadrupole. The C component is formed by the intermediate circuit capacitor module. The low-resistance, high-inductance R-L component is formed by the first and the second low-resistance, high-inductance connection; and the high-resistance, low-inductance R-L component is formed by the first and the second high-resistance, low-inductance connections.

Alternatively, the modules can have an identical structure, but the respective impedances of the individual components can be different.

The equivalent circuit diagram of the quadrupole can also be described as passive second order low-pass filter made from a first R-L component connected in series with the quadrupole and a C component connected in parallel with the quadrupole, with an additional second R-L component, that is connected in parallel with the first R-L component. Direct current and the low-frequency current components flow through the low-resistance, high-inductance R-L component, and high-frequency current components flow through the high-resistance, low-inductance R-L component. The ohmic resistance advantageously damps the high-frequency current components.

According to one embodiment, the resistance of the low-resistance, high-inductance connection can be neglected. Then, the equivalent circuit diagram of the quadrupole corresponds to an LC oscillating circuit with an additional R-L component connected in parallel with the L component. By the impressed currents of the switching devices, which are connected in parallel with the C component (that is with the intermediate circuit capacitor module), oscillating currents are excited. By these oscillating currents, the effective value of the current in the intermediate circuit capacitors is increased. Parallel connection of the first high-resistance, low-inductance connection and the second high-resistance, low-inductance connection additionally connects an R-L component with increased ohmic resistance in parallel with the L component of the LC oscillating circuit. This damps the oscillation.

A module of the intermediate circuit represents an LC oscillating circuit with an R-L component connected in parallel with the L component when the ohmic resistance of the low-resistance, high-inductance connection is negligible. An LC oscillating circuit with an R component in parallel with the L component would be optimally damped. In practice, this is impossible, since in reality every R component also has a non-negligible inductance L due to the mechanical distances and the associated conductor loop at high currents. The damping of an LC oscillating circuit with an additional ohmic resistance parallel to the L component has a flat optimum at $R_{opt}=\sqrt{L/C}$.

While direct current and the low-frequency AC component flow through the low-resistance, high-inductance connections, higher frequency AC components are conducted through the low-inductance, high-resistance connections between the intermediate circuit capacitor modules, which have lower inductance but higher ohmic resistance, and in the process these higher frequency AC components are damped. This advantageously reduces the unused effective currents in the low-resistance, high-inductance connections and in the intermediate circuit capacitors.

Since the intermediate circuit is designed for very high currents, the arrangement without the second R-L component would represent a very weakly damped C-L-C-L chain conductor of L-C oscillating circuits. By the impressed currents of the switching devices oscillating currents are excited and the effective value of the current in the intermediate circuit capacitors increases. Parallel connection of the second R-L component damps high-frequency oscillating currents. The damping is frequency-dependent and follows from the values of the inductance and the capacitance of the LC oscillating circuit.

According to one embodiment, the ohmic resistance of the low-inductance, high-resistance connection is adapted to the optimum damping, that is $R_{opt}=\sqrt{L/C}$ where L is the inductance of the low-resistance, high-inductance connection and C is the capacitance of the intermediate circuit capacitor module, in particular, the ohmic resistance of the low-inductance, high-resistance connection is in the range from $0.1 \cdot R_{opt}$ to $10 \cdot R_{opt}$.

For example, if the capacitance of the intermediate circuit capacitor module is 1,000 μF and the inductance of the low-resistance, high-inductance connections is 25 nH, then the optimum ohmic resistance $R_{opt}$ is 5 mΩ for optimal damping. The selected ohmic resistance can then advantageously lie in the range from 0.5 mΩ to 50 mΩ. At these capacitances, the frequencies to be damped lie approximately in the range between 5 kHz and 25 kHz.

In the case of a short circuit in a power phase module, in particular in one of the switching devices, the capacitor(s) of the associated intermediate circuit capacitor module is/are very quickly discharged. The other capacitors of surrounding intermediate circuit capacitor modules feed in to the short circuit through the low-resistance, high-inductance connections and the low-inductance, high-resistance connections. The ohmic resistance of the low-inductance, high-resistance connections between the intermediate circuit capacitor modules causes a rapid decay of the oscillations caused by the short circuit. A large part of the short circuit energy is converted into heat in the low-inductance, high-resistance connections, making it harmless. This can protect the other power phase modules, in particular the other switching devices and intermediate circuit capacitor modules, from destruction. Therefore, the modular intermediate circuit is advantageously surge-proof.

According to one embodiment of the modular intermediate circuit, the first terminals of adjacent intermediate circuit capacitor modules are connected through, in each case, a third low-resistance, high-inductance connection, and the second terminals of adjacent intermediate circuit capacitor modules are connected through, in each case, a fourth low-resistance, high-inductance connection. Then the current flows in the same direction in the first and the third low-resistance, high-inductance connection. In an analogous manner, the current in the second and the fourth low-resistance, high-inductance connection flows in the same direction. To allow the inductance of the conductor loop to be reduced, two opposite current directions must be routed close to one another.

According to one embodiment, the modular intermediate circuit can be designed so that for every low-resistance, high-inductance connection there is routed another associated low-resistance, high-inductance connection with opposite current direction. Routing the two current directions spatially close to one another effectively minimizes the size of the conductor loops. This decreases the inductance and makes the converter more efficient.

According to one embodiment, the first and the second low-resistance, high-inductance connection as well as the third and the fourth low-resistance, high-inductance connection are routed spatially close and parallel in sections. Synonymously, the first and the fourth low-resistance, high-inductance connection as well as the second and the third low-resistance, high-inductance connection can be routed spatially close and parallel in sections. In particular, spatially close and parallel in sections means that the conductors have no other current-carrying conductor arranged between them.

According to one embodiment of the modular intermediate circuit, the first terminals of adjacent intermediate circuit capacitor modules are connected through a third high-resistance, low-inductance connection, and the second terminals of adjacent intermediate circuit capacitor modules are connected through a fourth high-resistance, low-inductance connection. Alternatively, two of the high-resistance, low-inductance connections can be in the form of a common connection. They then have double the ohmic resistance of the two other high-resistance, low-inductance connections.

To allow the inductance of the conductors to be reduced, two opposite current directions must be routed close to one another. The high-resistance, low-inductance connections are preferably arranged parallel in sections and with alternating current directions; or, the common connection is arranged spatially between the two others. In particular, the conductors have no other current-carrying conductors arranged between them.

According to one embodiment, the intermediate circuit capacitor module has a third terminal and a fourth terminal. The intermediate circuit capacitor module can also have other terminals, for example, in the form of blade contacts. Multiple terminals can reduce the terminal inductance. The terminals are advantageously designed so that they have essentially identical impedances, allowing a symmetrical current flow into the intermediate circuit capacitor module from all terminals. The capacitors in the intermediate circuit capacitor module are then connected in parallel with the terminal pairs, for example.

According to one embodiment, each intermediate circuit capacitor module additionally has a third terminal and a fourth terminal, and the third terminals of the intermediate circuit capacitor modules each following immediately one after another in the chain are connected in each case through a third low-resistance, high-inductance connection, and the fourth terminals of the intermediate circuit capacitor modules each following immediately one after another in the chain are connected in each case through a fourth low-resistance, high-inductance connection.

According to one embodiment, each intermediate circuit capacitor module additionally has a third terminal and a fourth terminal, and the third terminals of the intermediate circuit capacitor modules each following immediately one after another in the chain are connected in each case through a third high-resistance, low-inductance connection, and the fourth terminals of the intermediate circuit capacitor modules each following immediately one after another in the chain are connected in each case through a fourth high-resistance, low-inductance connection.

According to one embodiment, the third terminals and the fourth terminals of the intermediate circuit capacitor modules each following immediately one after another in the chain are connected through two parallel connections, wherein namely the third high-resistance, low-inductance connections are connected in parallel with the third low-resistance, high-inductance connections; and the fourth high-resistance, low-inductance connections are connected in parallel with the fourth low-resistance, high-inductance connections.

According to one embodiment, the above-described chain conductor is doubled and spatially arranged so that a symmetry is formed in such a way that current-carrying conductors of opposite current directions run directly next to one another.

Further proposed is a converter circuit with a modular intermediate circuit according to the above-described embodiments. The converter circuit has at least two or more switching devices, in each case with at least one DC terminal pair and at least one first AC terminal, each switching device being associated with exactly one intermediate circuit capacitor module, and the DC terminal pair of every switching device being connected in parallel with the associated intermediate circuit capacitor module.

The converter circuit can have one or more groups of switching devices. The groups of switching devices have at least one AC output, and each group of switching devices is associated with, and is connectable in parallel with, exactly one intermediate circuit capacitor module. The DC terminals of the switching devices are then combined into one common DC terminal, for example.

According to one embodiment, the converter circuit is designed so that an electric current of at least 500 A or at least 1,000 A can flow, in an operating state of the converter circuit, from a DC terminal pair to an AC terminal of a switching device.

The alternating current produced by the converter can be used, for example, to drive an electric motor to drive the vehicle. In the same way, it can supply current to the on-board electronic system. The frequency and voltage at the AC output(s) can be adapted to the use in the vehicle.

Further proposed is an energy converter, in particular an electric motor or a dynamo, which is connected with a converter circuit, at least one AC terminal of a switching device being connected with the energy converter.

An energy converter can act as a dynamo, for example during braking with a regenerative brake. Then, the dynamo produces electrical energy from mechanical energy, and this electrical energy is carried to the converter. The converter converts the alternating current into direct current.

Further proposed is a vehicle, in particular a rail vehicle, with an energy converter, in particular a traction motor, for converting electrical energy into kinetic energy or vice versa. Besides the traction motor, it is also possible, for example to use a regenerative brake as a dynamo. The energy converter is connected into the converter circuit in such a way that the energy converter is connected with at least one of the first AC terminals of one of the switching devices.

Vehicles that are considered rail vehicles are, in particular trains, subways, metros, streetcars, high-speed trains, or similar vehicles.

The modular intermediate circuit can be realized by integrating, in each case, at least one switching device in one power phase module.

Another proposal of the invention relates to a power phase module in which these embodiments can be realized.

BRIEF DESCRIPTION OF THE DRAWINGS

The attached drawings illustrate embodiments and serve, together with the description, to explain the principles of the invention. The elements of the drawings are scaled relative to one another and are not necessarily true to scale. The same reference numbers are used to designate similar parts.

DESCRIPTION OF THE INVENTION

Figure 1:
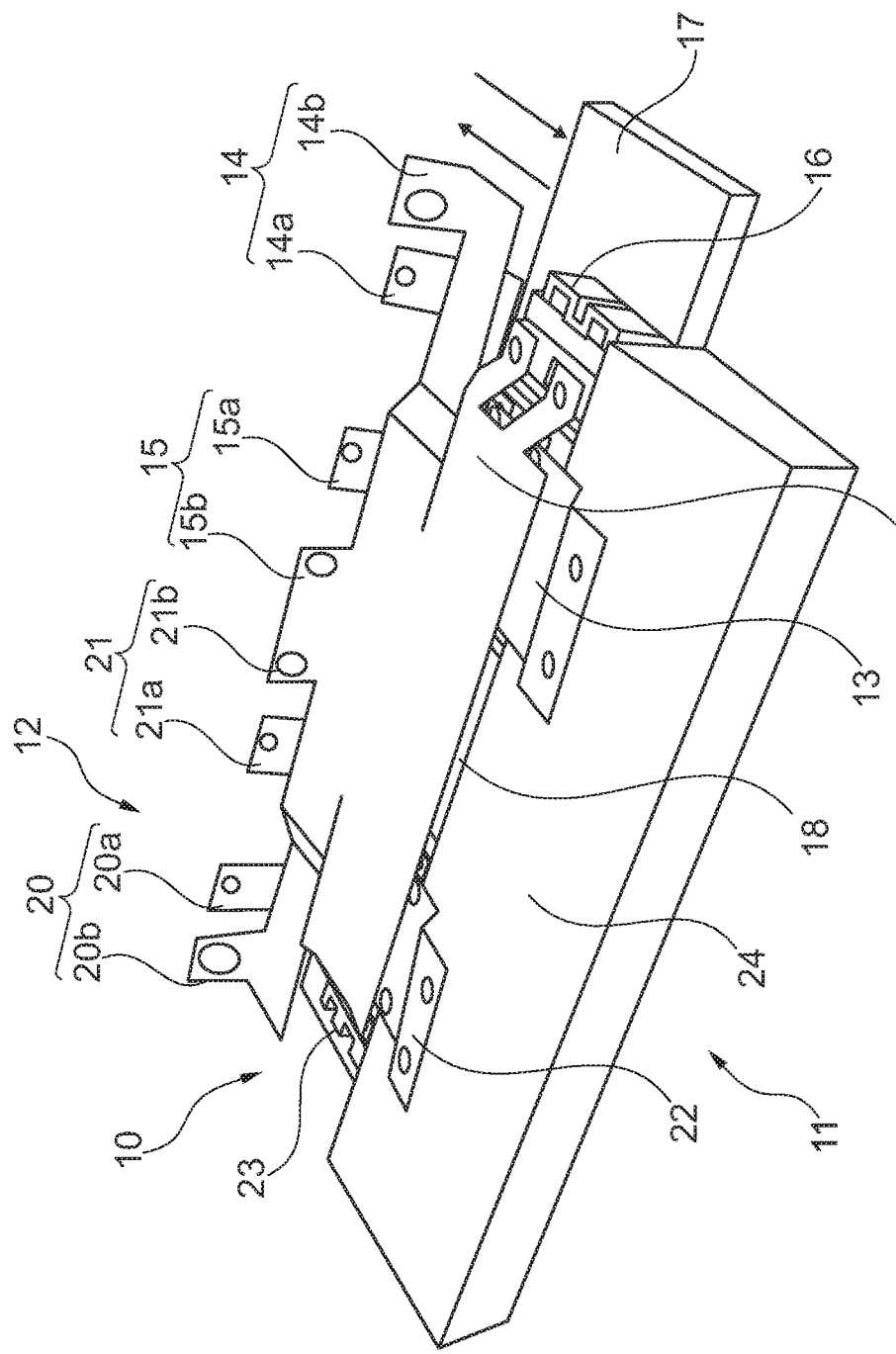
FIG. 1 shows a power phase module according to one embodiment.

FIG. 1 shows an embodiment of a power phase module 10. The power phase module 10 has approximately the shape of a flattened cuboid with two large-area sides and four small-area sides. The small-area sides can be faces of the power phase module 10. One face 12 of the power phase module 10 has a first DC terminal pair 14 and a second DC terminal pair 20 arranged on it. The face 12 also has a first DC capacitor terminal pair 15 and a second DC capacitor terminal pair 21 arranged on it.

Another side, in this case the opposite face 11 of the power phase module 10, has a first AC terminal 13 arranged on it. The opposite face 11 also has a second AC terminal 22 arranged on it.

A first switching device 16 is connected with the first DC terminal pair 14 and the first AC terminal 13. The switching device 16 is arranged on a cooling device 17, so that the cooling device 17 can carry heat that arises from the switching device 16 away and out of the power phase module 10.

The power phase module 10 further has a second switching device 23 that is connected with the first DC terminal pair 14 and with a second AC terminal 22. It is arranged on the cooling device 17 next to the first switching device 16. The two switching devices 16, 23 are arranged in a plane perpendicular to the face.

The DC capacitor terminal pairs 15, 21 are arranged next to one another and between the two DC terminal pairs 14, 20. The DC capacitor terminal pairs 15, 21 and the DC terminal pairs 14, 20 are arranged in a plane and in a row.

Figure 2:
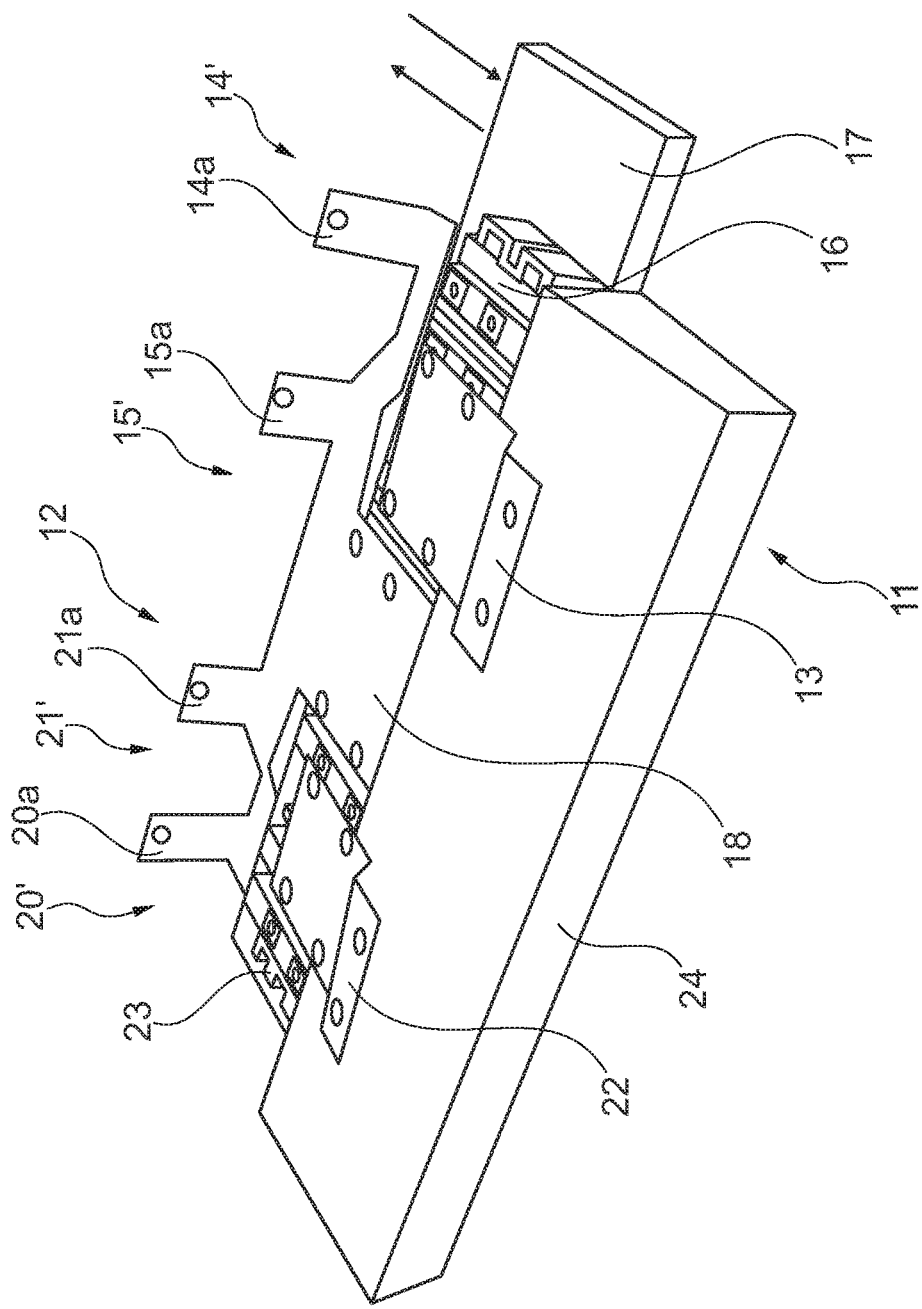
FIG. 2 shows the power phase module according to the embodiment of FIG. 1, wherein a cross bridge has been removed.

The DC capacitor terminal pairs 15, 21 and the DC terminal pairs 14, 20 each have a first terminal 14a, 15a, 20a, 21a and a second terminal 14b, 15b, 20b, 21b. Connection elements are arranged in or on the terminals. The first terminals 14a, 15a, 20a, 21a are connected together through a first cross bridge 18. The second terminals 14b, 15b, 20b, 21b are connected together through a second cross bridge 19. Details of the second cross bridge 19 are hidden in FIG. 1. These details are illustrated in FIG. 2, which shows an embodiment of the power phase module 10 in which no second cross bridge 19 is shown.

The first terminals 14a, 15a, 20a, 21a are formed in a single piece with the first cross bridge 18. The first cross bridge 18 has a piece of sheet metal. Bent areas of the pieces of sheet metal form the first terminals 14a, 15a, 20a, 21a for connecting to current bars. The connection elements are in the form of drill holes for a screw connection, for example. The first terminals 14a, 15a, 20a, 21a can also be put together from multiple pieces, i.e., from multiple parts. In one embodiment, this applies in an analogous, but not necessarily identical manner for the second cross bridge 19 and the second terminals 14b, 15b, 20b, 21b. The first cross bridge 18 and the second cross bridge 19 can be designed differently, and can differ, for example, by being in a single piece or by different materials or coatings.

The first cross bridge 18 connects the first terminal 14a of the first DC terminal pair 14 with the first switching device 16. The second cross bridge 19 connects the second terminal 14b of the first DC terminal pair 14 with the first switching device 16. This causes the direct current to flow from the first DC terminal pair 14 through the cross bridges 18, 19 into the switching device 16, where it is converted. The alternating current that is produced can be tapped at the first AC terminal 13. Conversely, it is also possible to convert an alternating current into a direct current.

The first and second cross bridges 18, 19 run directly next to one another, and sections of them are parallel. They are spatially close to one another and are electrically insulated from one another, and are designed for high voltages of over 500V, in particular voltages between approximately 600V and 4,500V, and for high currents of more than 100 A, in particular for currents from 100 A to 1,000 A. For example, the current in a dual switching module can be 500 A and in a single switching module it can be 800 A. The applied voltage can limit the current flow by means of a maximum power in an operating state.

In this embodiment, a cross bridge 18, 19 has a large-area sheet metal area and at least two areas bent away from it. In an operating state, the cross bridges 18, 19 have a high current of multiple hundred amps flowing through them. Therefore, the material and thickness of the cross bridges 18, 19 must be correspondingly adapted to this current load.

The large-area sheet metal area of the cross bridges 18, 19 can be essentially parallel to the large-area sides of the power phase module. Therefore, the cross bridges 18, 19 can be arranged transverse, that is essentially perpendicular, to the course of connected current bars.

For example, the cooling device 17 can be arranged on or along one of the large-area sides of the power phase module, or it can form one of these sides. The switching device 16 can be arranged on the cooling device 17. The cooling device 17 can be arranged on one side of the switching device 16, and the cross bridges 18, 19 can be arranged on an opposite side of the switching device 16.

In this embodiment, the switching devices 16, 23 have a dual switching module and therefore are connected with both the first cross bridge 18 and the second cross bridge 19. Dual switching modules are electrically built as full-wave rectifiers and can convert both potentials of the two cross bridges 18, 19 for the alternating current phase.

In an operating state, each switching device 16, 23 can be operated independently from one another by a controller 24, in particular a gate controller, as a full-wave rectifier, and produce an alternating current at the respective AC terminal 13, 22. In particular, the switching devices have controllable semiconductor elements. These semiconductor elements can be semiconductor elements with controllable gate electrodes. Then, the controller 24 controls the gate voltages at the gate electrodes and thereby the current flow through the semiconductor elements or the switching device 16, 23. In particular, the semiconductor elements can be IGBTs, and the controller comprises the gate controller 24 of the gates of the IGBTs.

According to one embodiment, the controller 24 can be arranged on a face opposite the terminal pairs of the power phase module; this face can also be referred to as second or rear face.

According to one embodiment, the controller 24 can be mechanically supported by the cooling device 17 or the switching devices 16, 23, or by both.

The power phase module 10 in FIG. 1 has two DC capacitor terminal pairs 15, 21. The terminals 15a, 15b, 21a, 21b are arranged in a row so that in an operating state the two second terminals 15b, 21b lie at one potential and are surrounded from outside by the first terminals 15a, 21a, which are at another potential. This produces a mirror symmetry of the terminals and thus of the potentials. In this embodiment, the terminals of the two DC terminal pairs 14, 20 have mirror symmetry in the same way. Each of the first terminals 14a, 15a, 20a, 21a, and second terminals 14b, 15b, 20b, 21b can also be interchanged with the associated terminal of the respective pair. The mirror symmetry is maintained. The symmetry has the advantage that the impedance is identical, or almost identical, at each of the terminals for both current directions. This allows a uniform current flow.

To connect the DC terminals 14a, 15a, 20a, 21a, 14b, 15b, 20b, 21b to current bars or to an intermediate circuit capacitor module, these DC terminals can have connection elements for electrical connection and/or a fastener for mechanical fastening. In this sample embodiment, holes are provided for inserting a corresponding contact element and/or fastener.

The connection elements of the DC capacitor terminals 21, 15 can be differently designed than the connection elements of the DC terminal pairs 14, 20. For example, drill hole sizes can vary or completely different connection elements can be used. The distance of the first terminal 14a, 15a, 20a, 21a to the second terminal 14b, 15b, 20b, 21b in the case of DC capacitor terminal pair(s) 15, 21 can be as well different as in the case of DC terminal pair(s) 14, 20.

The DC capacitor terminal pairs 15, 21 are connected to connectors and intermediate circuit capacitor modules, and the DC terminal pairs 14, 20 are connected to current bars.

The power phase module 10 in FIG. 1 has a gate controller 24. The gate controller 24 is connected with the switching devices 16, 23. It controls the switching devices 16, 23 in such a way that an applied direct voltage at the switching device 16, 23 is converted into an alternating voltage, or vice versa. In particular, the switching device can have IGBTs with a controllable gate.

The gate controller 24 specifies a frequency at which the switching devices 16, 23 are controlled so that an alternating voltage with the corresponding frequency is produced at the respective AC outputs 13, 22. The frequencies and/or the voltage curve of the AC outputs can be different. In particular, the alternating voltages can be matched to one another so that different phase inputs of an electric motor can be fed with different AC outputs 13, 22.

The cooling device 17 can have hydraulic connections to carry coolant into and out of the cooling device 17. The hydraulic connections are advantageously arranged on the face 12, so that a connection by pushing the power phase module 10 onto the current bar pairs and the intermediate circuit capacitor module also connects the cooling device with its hydraulic connections to a coolant guiding system.

FIG. 2 shows the embodiment of the power phase module 10 of FIG. 1 without the second cross bridge 19 and the first terminals 14b, 15b, 20b, 21b, of the DC capacitor terminal pairs 15', 21' and the DC terminal pairs 14', 20'.

In FIG. 1 the second cross bridge 19 concealed the fact that the switching device 16 is connected with the first cross bridge 18. Likewise, the switching device 16 is connected with its associated AC terminal 13.

Figure 3:
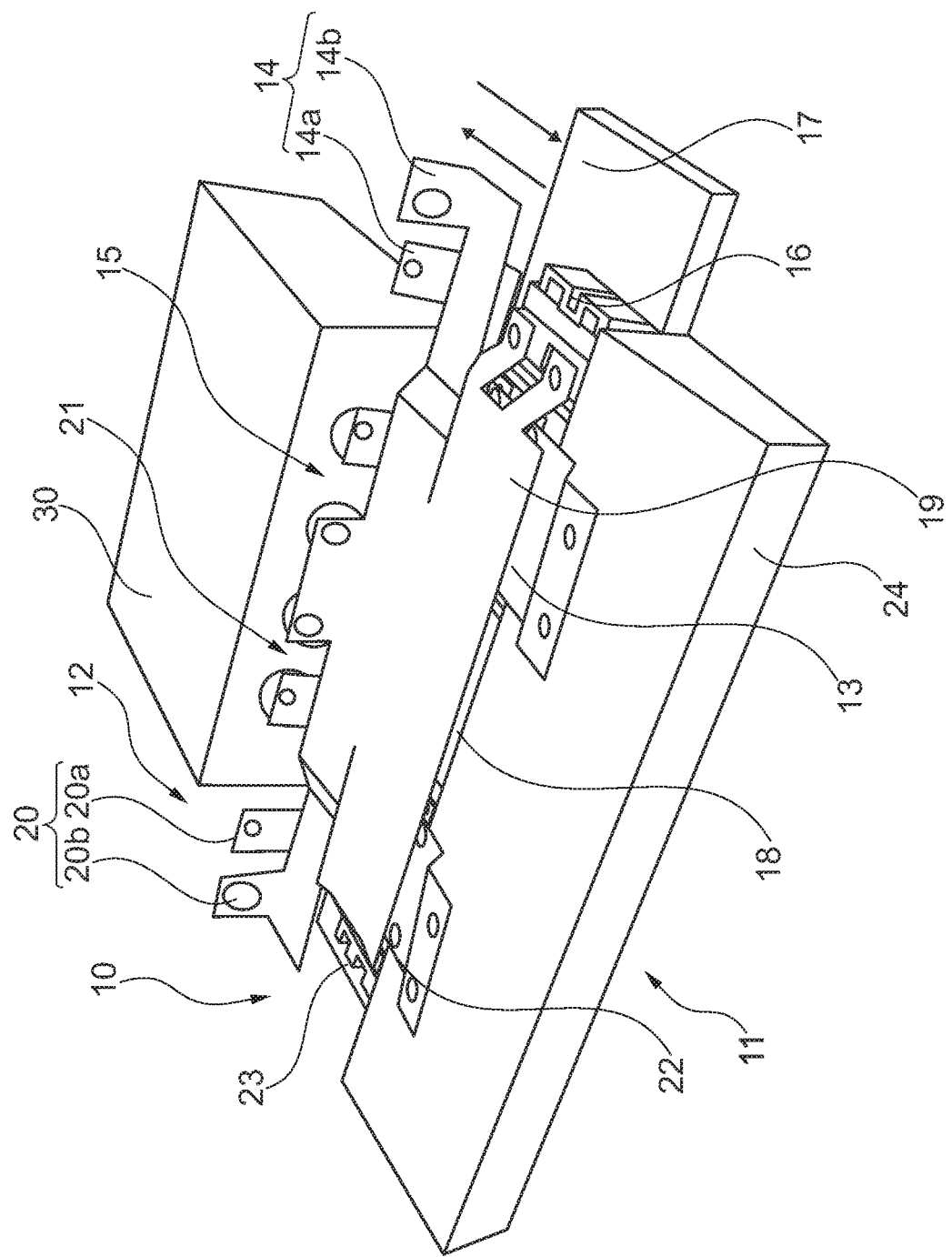
FIG. 3 shows the power phase module according to the embodiment of FIG. 1 with an intermediate circuit capacitor module connected to it.

FIG. 3 shows the power phase module 10 with an intermediate circuit capacitor module 30 connected to it. The intermediate circuit capacitor module 30 has four terminals and therefore is connected to both the first DC capacitor terminal pair 15 and also to the second DC capacitor terminal pair 21.

The switching devices 16, 23 make contact with the cross bridges 18, 19 via, in each case, two contact points. Each switching device is in the form of a dual switching module and has two half bridges, each half bridge making contact with the cross bridges via one contact point.

The intermediate circuit capacitor module 30 has at least one capacitor, which is capable of serving as an intermediate circuit capacitor. The cross bridges 18, 19 together with the capacitor of the intermediate circuit capacitor module 30 are part of the intermediate circuit in an operating state of the power phase module 10 or of the converter. The intermediate circuit capacitor is part of the commutation circuit, that is also the electric circuit in which the current changes during a switching operation of the switching device 16, 23. Therefore, the intermediate circuit capacitor of the intermediate circuit capacitor module 30 is also referred to as a commutation capacitor.

The electrical connection between switching devices 16, 23 and intermediate circuit capacitor module 30 is low-inductance. This is achieved by the compact structure of the power phase module 10. The intermediate circuit capacitor module 30 is spatially closely connected to the switching devices 16, 23, and thus its connection is low-inductance. In addition, the cross bridges 18, 19 are arranged close to one another or on top of one another. This causes optimal overlap among the current paths in the cross bridges 18, 19 between switching device 16, 23, intermediate circuit capacitor module 30, and DC terminal pairs 14, 20, and the inductance of the power phase module 10 is reduced.

Figure 4:
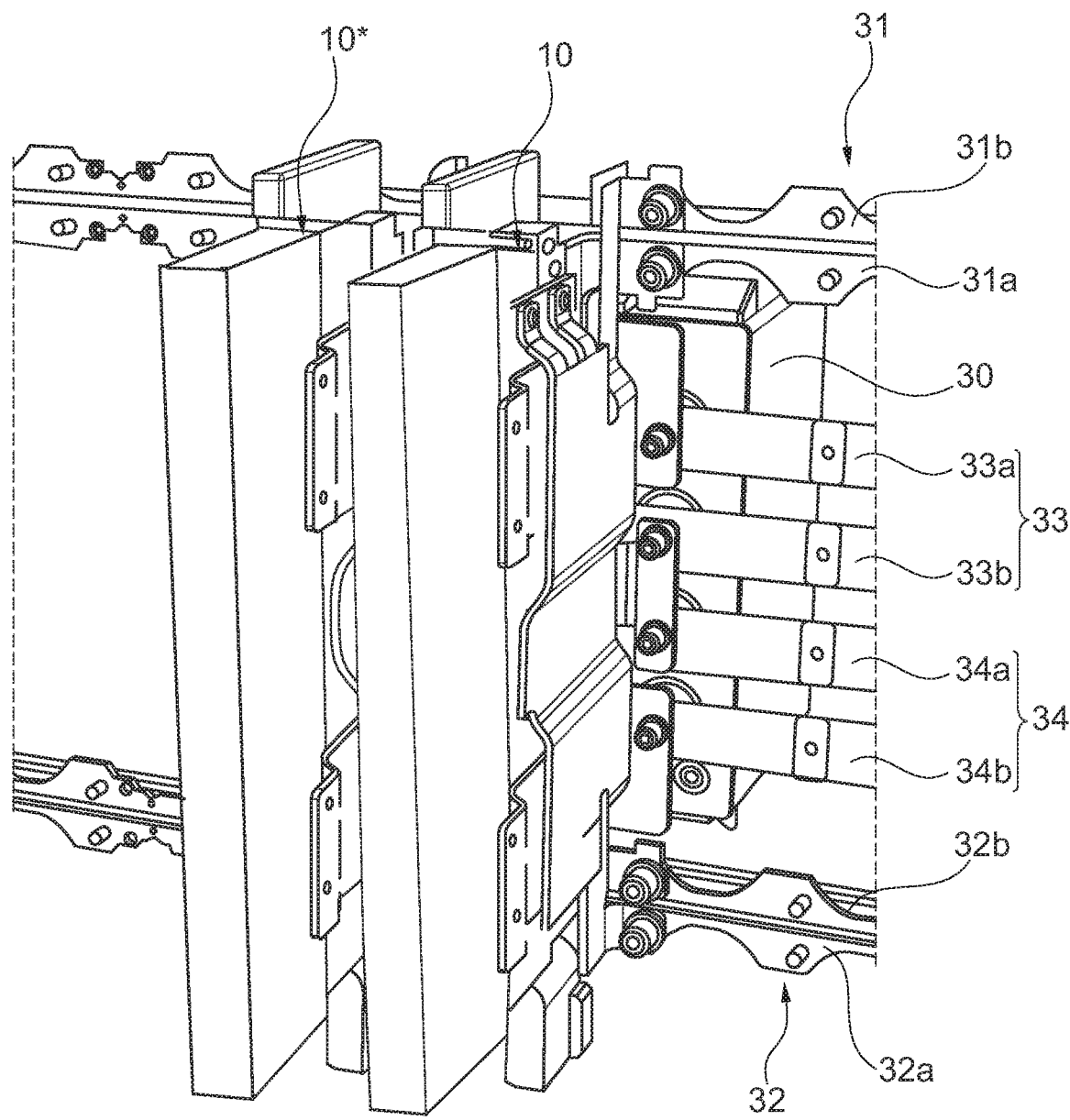
FIG. 4 shows a converter according to one embodiment.

FIG. 4 shows a converter according to an embodiment with two power phase modules 10, 10*. For clarity, only two power phase modules 10, 10* are shown. More power phase modules can be arranged next to the others, according to the orientation of the two that are shown. The power phase modules 10, 10* are arranged next to one another so that their faces point in the same direction.

Figure 5:
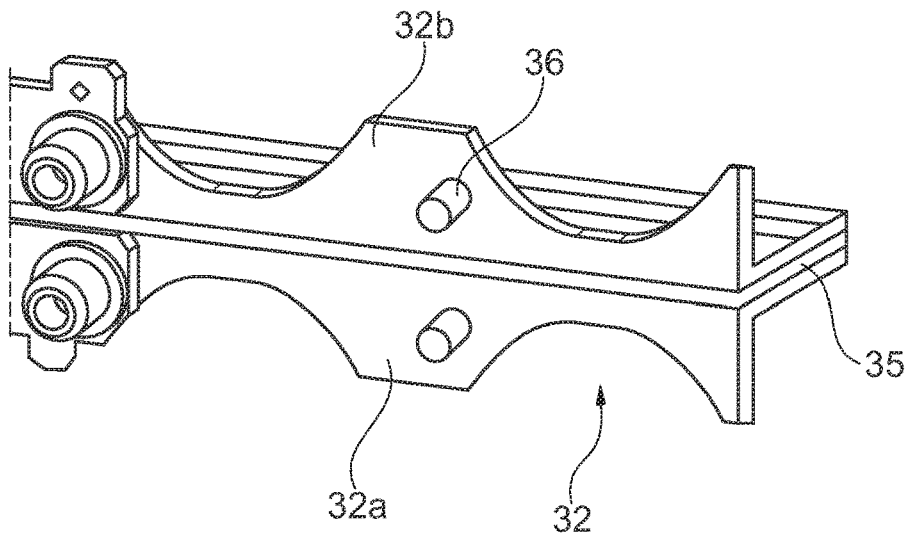
FIG. 5 shows a detail view of current bars according to one embodiment.

The DC terminal pairs are each connected to current bar pairs 31, 32 that run behind the faces of the power phase modules 10, 10*. The current bar pairs 31, 32 have a first current bar 31a, a second current bar 31b, a third current bar 32a, and a fourth current bar 32a. A detail view of a current bar pair 32 is shown in FIG. 5.

Each power phase module 10, 10* is associated with an intermediate circuit capacitor module 30, 30* and each power phase module 10, 10* is connected to its DC capacitor terminal pairs with the associated intermediate circuit capacitor module 30, 30*. In the representation shown in FIG. 4, the second intermediate circuit capacitor module 30* is not visible, since it is arranged behind the power phase module 10*, on its face. The connection is made electrically and mechanically through connection elements. The connection elements with the corresponding contact elements are holes or nuts and bolts.

The current bar pairs 31, 32 run essentially parallel to one another and are spaced apart from one another so that the intermediate circuit capacitor module 30 can be placed between the current bar pairs 31, 32. Then, the terminals of the current bar pairs 31, 32 and the terminals of the intermediate circuit capacitor module 30 are arranged in a plane and in a row, so that the power phase module can be pushed onto this plane with its face first, and connected.

The converter has connector pairs 33, 34. The first connector 33a, the second connector 33b, the third connector 34a, and the fourth connector 34b electrically connect the intermediate circuit capacitor modules 30 with one another. The number of connectors 33a, 33b, 34a, 34b can vary, depending on the number of terminals of the intermediate circuit capacitor modules 30 or the number of DC capacitor terminal pairs of the power phase modules 10, 10*. The number of connectors 33a, 33b, 34a, 34b, is advantageously identical with the number of terminals of the DC capacitor terminal pairs, so that all terminals can be connected. The connectors 33a, 33b, 34a, 34b connect the intermediate circuit capacitor modules 30, so that they are connected in parallel.

According to one embodiment, in case of a converter with connectors 33a, 33b, 34a, 34b, both the intermediate circuit capacitor modules 30, 30* and the switching devices 16, 16* are connected in parallel in the power phase modules 10, 10*. In addition to the parallel connection through the connectors 33a, 33b, 34a, 34b, the switching devices 16, 16* and the intermediate circuit capacitor modules 30, 30* are connected in parallel through the current bars 31a, 31b, 32a, 32b and the cross bridges 18, 19, 18*, 19*. This second parallel connection has a higher inductance and a lower ohmic resistance than that of the connectors 33a, 33b, 34a, 34b. Therefore, the intermediate circuit capacitor modules 30, 30* are electrically connected in parallel through two low-inductance, high-resistance connections, on the one hand, and, on the other hand, through two high-inductance, low-resistance connections.

According to one embodiment, the material of the connectors 33a, 33b, 34a, 34b has a greater specific resistance than the material of the current bars 31a, 31b, 32a, 32b does. For example, the connectors 33a, 33b, 34a, 34b are made essentially from a steel, and the current bars 31a, 31b, 32a, 32b are made essentially of copper or aluminum.

The connectors 33a, 33b, 34a, 34b are made, for example, from a piece of sheet metal. This piece of sheet metal can be put together in sections, so that a removal of an intermediate circuit capacitor module 30, 30* only requires removing the connectors 33a, 33b, 34a, 34b at the connection points to the intermediate circuit capacitor module 30, 30*.

FIG. 5 shows a detail view of a current bar pair 32 with a first current bar 32a and a second current bar 32b. The current bars are mechanically connected with one another and are electrically insulated from one another by an insulation 35. This insulation can consist of a solid material, for example a synthetic material.

Current bars can have a corresponding contact element 36 for fastening to the connection element of a DC terminal pair. In this sample embodiment, the corresponding contact element is a pin with or without thread to fasten a nut or a clip, for example, to a DC terminal pair 14, 20.

Figure 6:
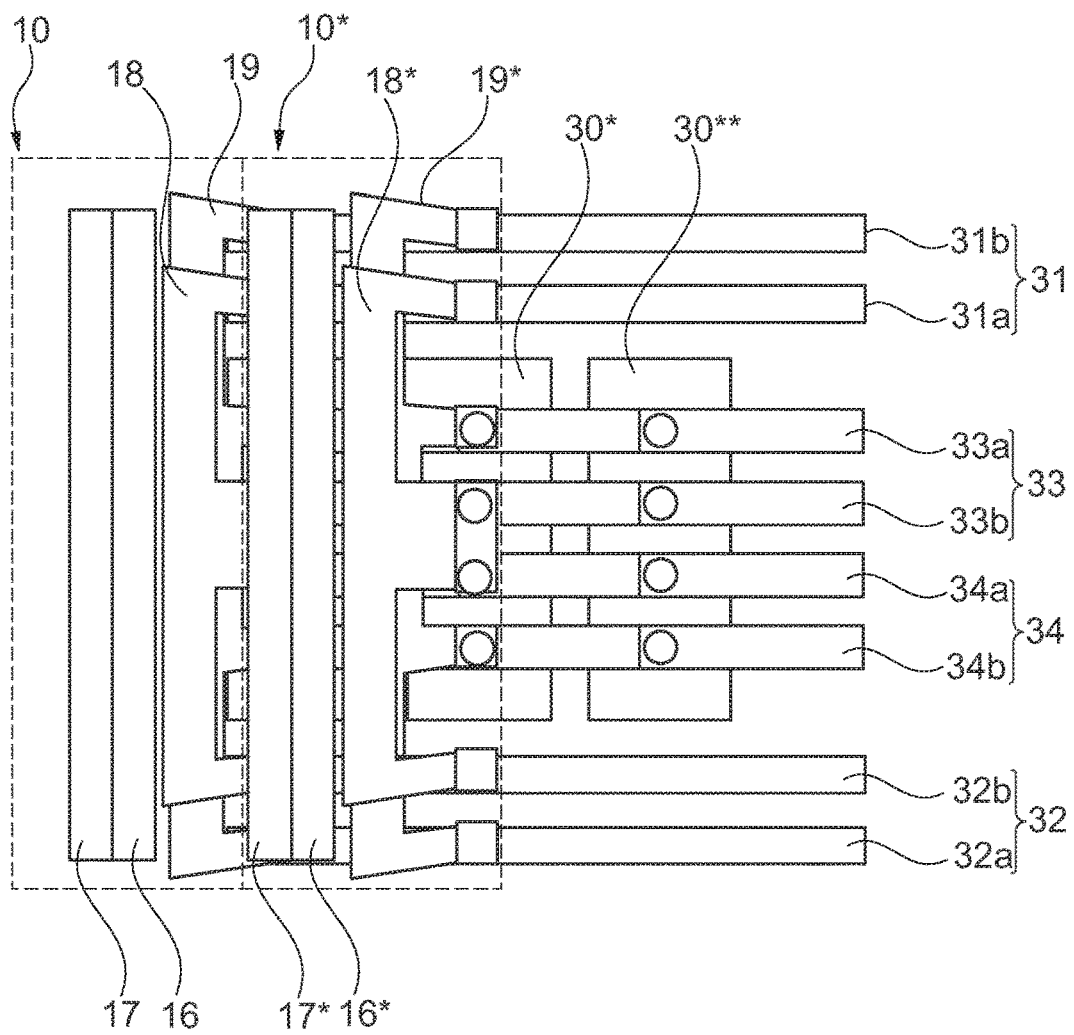
FIG. 6 is a schematic representation of the arrangement of the converter.

FIG. 6 shows a simplified schematic representation of the removal of a modular converter. For clarity, only two power phase modules 10, 10* are drawn in. Every power phase module 10, 10* has a switching device 16, 16* and a cooling device 17, 17*. This illustration does not show AC terminals or control devices.

According to one embodiment, the power phase module has at least one controller 24 to control the switching device 16, 23. The controller is advantageously arranged on the other face 11. In particular, the controller can be a gate controller 24 and control of the switching device 16, 23 can be performed through gates in the semiconductor components.

The power phase modules 10, 10* are connected to current bar pairs 31, 32. Between the current bar pairs 31, 32, intermediate circuit capacitor modules (30), 30* are arranged. Every power phase module 10, 10* has an intermediate circuit capacitor module (30), 30* associated with it, but in this illustration only of one of the two intermediate circuit capacitor modules (30), 30* can be seen. Another intermediate circuit capacitor module 30** is arranged so that another power phase module with the same orientation as of the two other power phase modules 10, 10* could be placed above it.

The intermediate circuit capacitor modules 30 are connected in parallel through connectors 33a, 33b, 34a, 34b. In addition, the intermediate circuit capacitor modules are connected in parallel through the cross bridges 18, 19, 18*, 19* and the current bar pairs 31, 32.

Figure 7:
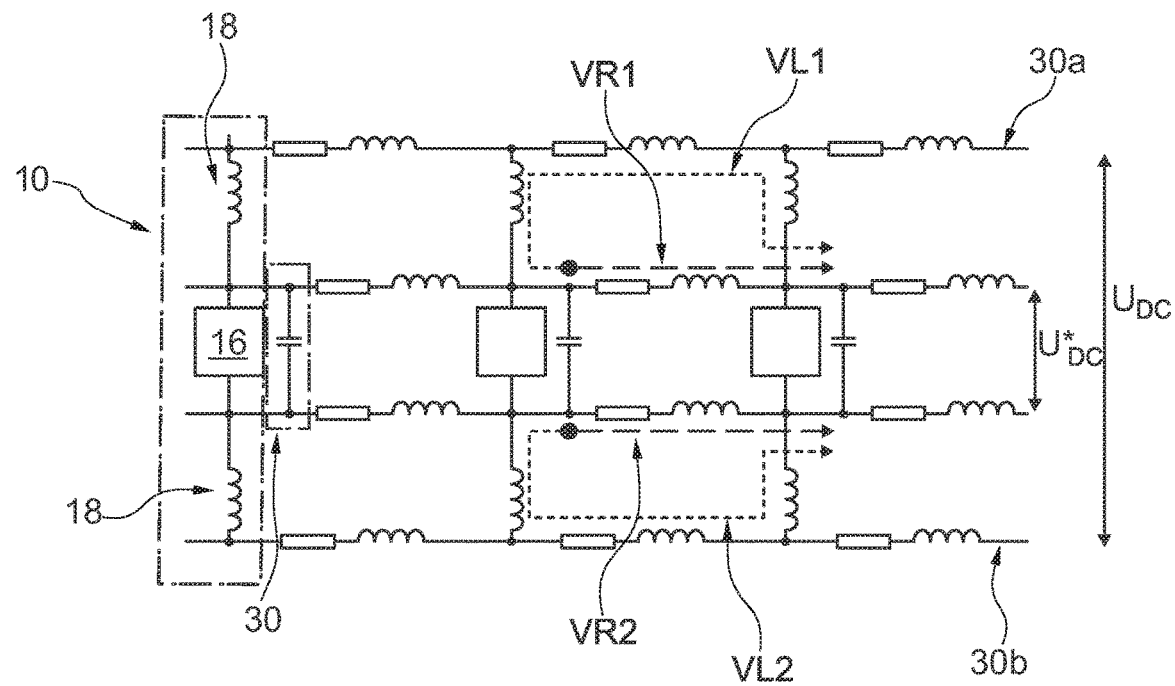
FIG. 7 shows a modular intermediate circuit according to one embodiment.

FIG. 7 shows an embodiment of the modular intermediate circuit. Three intermediate circuit capacitor modules 30 are sketched. The switching devices 16 are connected in parallel with, in each case, an intermediate circuit capacitor module 30. For clarity, only one of the switching devices 16 and only one of the intermediate circuit capacitor modules 30 is labeled with a reference sign. In this embodiment, the three switching devices 16 shown and the three intermediate circuit capacitor modules 30 shown are identical. The intermediate circuit capacitor modules 30 have in each case a first terminal and a second terminal, the first terminals two intermediate circuit capacitor modules 30 immediately following one after another in each case in the chain being connected through a first low-resistance, high-inductance connection VL1 and a first high-resistance, low-inductance connection VR1, the second terminals two intermediate circuit capacitor modules 30 immediately following one after another in each case in the chain being connected through a second low-resistance, high-inductance connection VL2 and a second high-resistance, low-inductance connection VR2, the first high-resistance, low-inductance connection VR1 being connected in parallel with the second high-resistance, low-inductance connection VR2, and the first low-resistance, high-inductance connection VL1 being connected in parallel with the second low-resistance, high-inductance connection VL2.

The first low-resistance, high-inductance connection VL1 and the second low-resistance, high-inductance connection VL2 connect, in parallel and in a low-resistance high-inductance manner, the two intermediate circuit capacitor modules 30 immediately following one after another in each case in the chain. In addition, the first high-resistance, low-inductance connection VR1 and the second high-resistance, low-inductance connection VR2 connect, in parallel and in a high-resistance low-inductance manner, the two intermediate circuit capacitor modules 30 immediately following one after another in each case in the chain.

The impedances of the first low-resistance, high-inductance connection VL1 and of the second low-resistance, high-inductance connection VL2 are identical and the impedances of the first high-resistance, low-inductance connection VR1 and of the second high-resistance, low-inductance connection VR2 are identical. Therefore, the modular intermediate circuit has a symmetry that allows a symmetrical current flow in both current directions.

In the embodiment of FIG. 7, each of the intermediate circuit capacitor modules 30 has an intermediate circuit capacitor. Therefore, each of the capacitors shown forms an intermediate circuit capacitor module 30. Each intermediate circuit capacitor has a first terminal and a second terminal, and the first terminal and the second terminal of the intermediate circuit capacitor simultaneously form the first terminal and the second terminal of the intermediate circuit capacitor module. Alternatively, it is also possible for multiple intermediate circuit capacitors to form the intermediate circuit capacitor module 30.

The low-resistance, high-inductance connections VL1, VL2 can be realized, for example, by parallel current bars 30a, 30b and cross bridges 18. In an operating state there is a direct voltage $U_{DC}$ between the upper current bar 30a and the lower current bar 30b. This direct voltage $U_{DC}$ feeds the switching devices 16, which generate an alternating voltage through a control device. The associated intermediate circuit capacitors in the intermediate circuit capacitor modules 30 serve as temporary electrical storage and as buffers. Across the first terminal and the second terminal of the intermediate circuit capacitor modules 30 there is a voltage $U^*_{DC}$. The circuit of the intermediate circuit capacitor modules 30 is parallel and in a chain relative to the direct voltage across the first terminal and the second terminal of the intermediate circuit capacitor module 30, this direct voltage being denoted as $U^*_{DC}$.

The low-resistance, high-inductance connections VL1, VL2 are shown by dotted lines, and each contains three inductors and one ohmic resistor. The high-resistance, low-inductance connections VR1, VR2 are shown by dashed lines, and each contains one inductor and one ohmic resistor. The ohmic resistance in the high-resistance, low-inductance connections VR1, VR2 is, in each case, greater than the ohmic resistance in the low-resistance, high-inductance connections VL1, VL2.

The inductances drawn and the ohmic resistances in FIG. 7 are essentially determined by the sizes of the conductor loops, the conductivity of the conductors, and the cross section of the conductor. Since the converter is designed as a power converter with high currents, the conductors must be correspondingly adapted. For example, the conductors that form the low-resistance, high-inductance connections VL1, VL2 have a material with high conductivity, in particular copper or aluminum, and the conductors that form the high-resistance, low-inductance connections VR1, VR2 have a material of lower conductivity, in particular steel.

Figure 8:
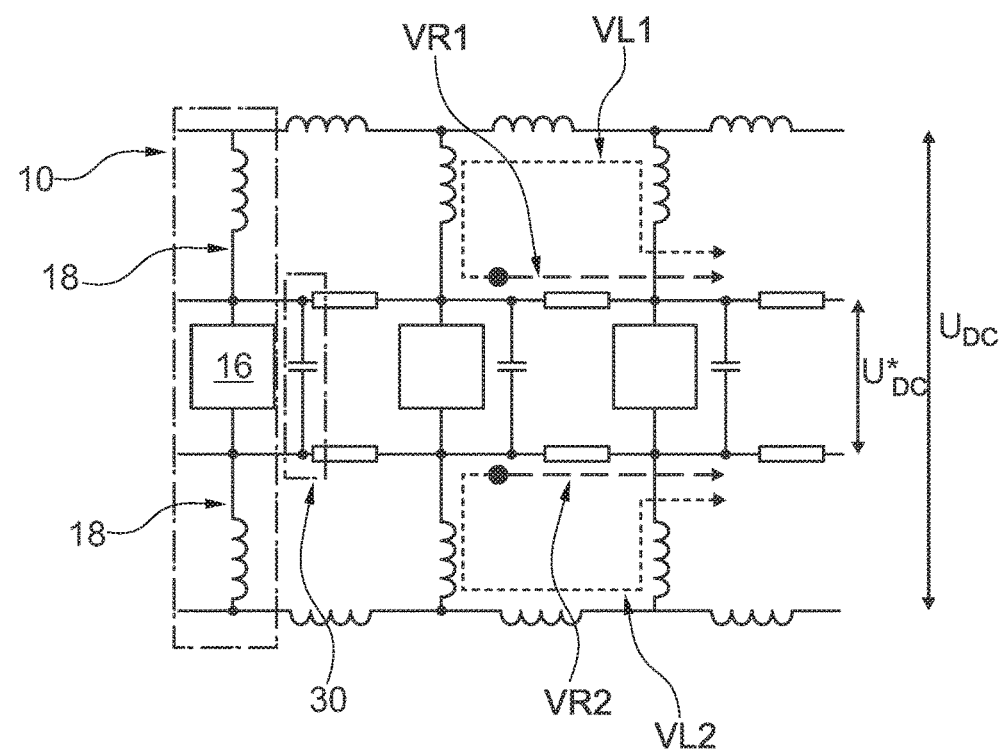
FIG. 8 shows a simplified modular intermediate circuit according to one embodiment.

FIG. 8 shows a simplified representation of the circuit in FIG. 7. The ohmic resistances of the low-resistance, high-inductance connections VL1, VL2 and the inductances of the high-resistance, low-inductance connections VR1, VR2 are no longer drawn in. In practice, conductors without ohmic resistance or without inductance are not, per se, possible. Therefore, the circuit should be understood by the person skilled in the art so that the conductors are essentially characterized either by their inductive properties or by their ohmic properties.

Since the intermediate circuit is designed for very high currents, the arrangement without the high-resistance, low-inductance connections VR1, VR2 would represent a very weakly damped L-C chain conductor. In the representation shown in FIG. 8, the modular intermediate circuit forms an L-C chain conductor with an additional R component parallel to the L component. Here, the inductance of the high-resistance, low-inductance connections VR1, VR2 and the ohmic resistance of the low-resistance, high-inductance connections VL1, VL2 is neglected. The L component is formed by the inductance L of the first low-resistance, high-inductance connections VL1 and the second low-resistance, high-inductance connections VL2, and the C component is formed by the capacitance C of the intermediate circuit capacitor module 30, the L component and the C component forming an LC oscillating circuit and the R component additionally being connected in parallel with the L component. The R component is formed by the first high-resistance, low-inductance connection VR1 and the second high-resistance, low-inductance connection VR2. Therefore, the ohmic resistance of the high-resistance, low-inductance connections VR1, VR2 is connected in such a way that it damps the oscillation of the LC oscillating circuit.

In addition to the direct voltages $U_{DC}$ and the direct voltage $U^*_{DC}$, parasitic alternating voltage components are produced by the switching device and the LC oscillating circuit in the system. These alternating current components reduce the efficiency of the converter and should be damped. For optimal damping of the LC oscillating circuit, the ohmic resistance of the first high-resistance, low-inductance connections VR1 and the second high-resistance, low-inductance connections VR2 lies in the range from $0.1 \cdot R_{opt}$ to $10 \cdot R_{opt}$ and $R_{opt} = \sqrt{L/C}$ where L is the inductance of the low-resistance, high-inductance connections VL1, VL2 and C is the capacitance of the intermediate circuit capacitor module 30.

The modular intermediate circuit in FIGS. 7 and 8 can be expanded by other intermediate circuit capacitor modules with a corresponding circuit in parallel and in a chain with the other intermediate circuit capacitor modules 30. In particular, a modular intermediate circuit can have, for example, 1 to 6 or 1 to 8 intermediate circuit capacitor modules 30. All intermediate circuit capacitor modules 30 within the chain are identically connected among each other with their adjacent intermediate circuit capacitor modules 30. This is except for the two intermediate circuit capacitor modules 30 on the edges of the chain, since they have only one immediate neighbor.

In FIG. 8 the part of the circuit that corresponds to a power phase module 10 is drawn in. The switching device 16 and part of the low-resistance, high-inductance connections VL1, VL2, namely the cross bridges 18, are part of the power phase module 10. The high-resistance, low-inductance connections VR1, VR2 are not part of the power phase module. The power phase module 10 is also placed on the current bars 30a, 30b, forming the low-resistance, high-inductance connections VL1, VL2 with them and the cross bridges 18 arranged in the power phase module 10. This means that in this embodiment the modular intermediate circuit is produced only by means of the power phase module 10.

Figure 9:
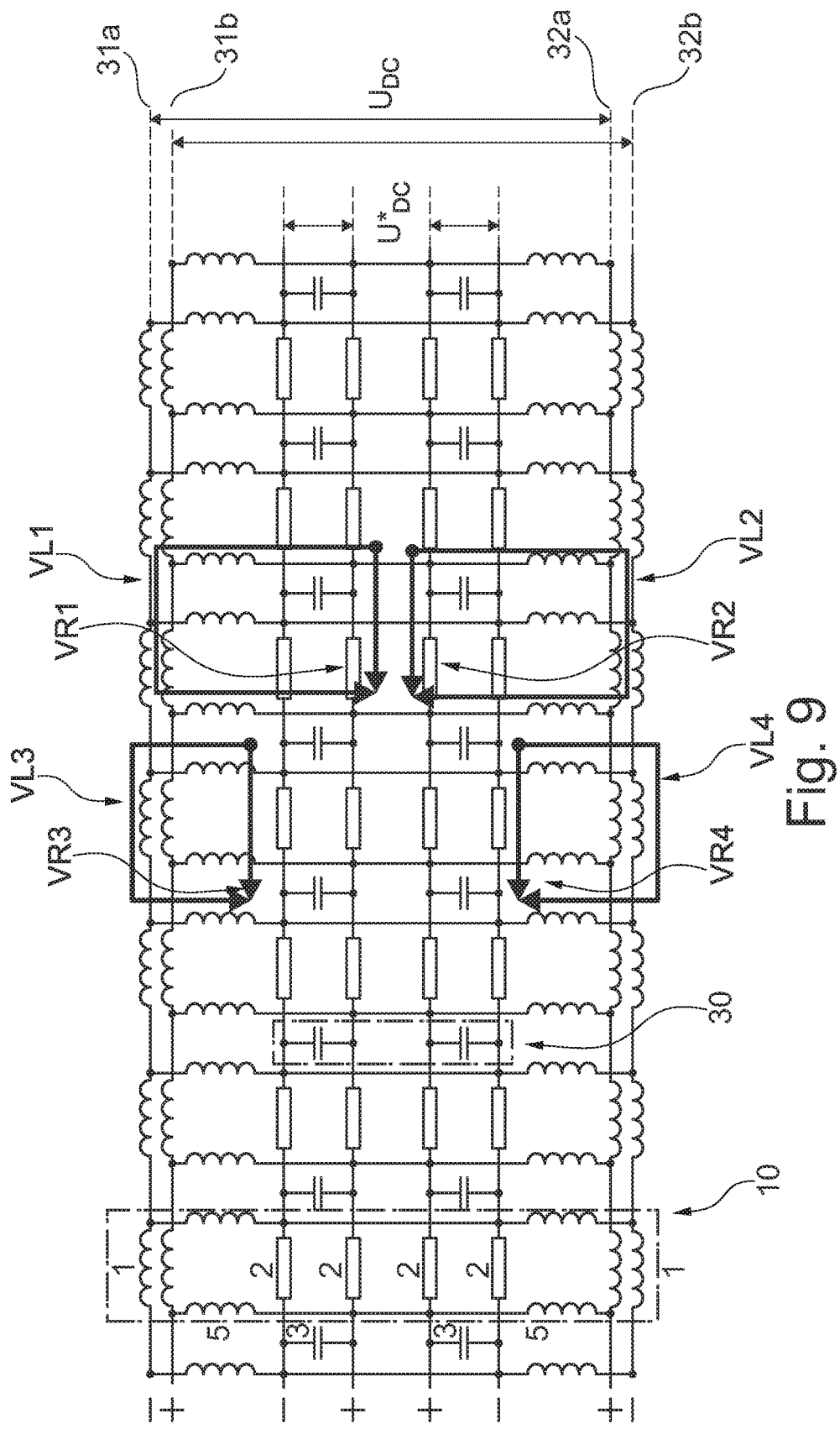
FIG. 9 shows a modular intermediate circuit for a converter with 8 modules.

FIG. 9 shows an embodiment of the modular intermediate circuit. Eight modules are shown. For clarity, no switching devices are drawn in. They are in each case connectable parallel to the intermediate circuit capacitor modules 30. All intermediate circuit capacitor modules 30 are connected in parallel and in a chain. They have four terminals. To improve clarity, reference signs are also drawn in only once. Each module of the intermediate circuit has identical components.

In an analogous manner to FIG. 8, FIG. 9 does not show the ohmic resistances of the low-resistance, high-inductance connections VL1, VL2, VL3, VL4 or the inductances of the high-resistance, low-inductance connections VR1, VR2, VR3, VR4.

In the embodiment of FIG. 9, each of the intermediate circuit capacitor modules 30 has two intermediate circuit capacitors. The intermediate circuit capacitors are connected between a first terminal and a second terminal and between a third terminal and a fourth terminal of the intermediate circuit capacitor module 30. The second and the third terminal are at the same potential and the first and the fourth terminal are at the same potential. In an operating state, there is a direct voltage $U^*_{DC}$ across the first and the second terminal and across the third and the fourth terminal, respectively. With respect to this direct voltage, the two intermediate circuit capacitors are connected in parallel.

The four terminals of the intermediate circuit capacitor modules are in each case connected through one of the low-resistance, high-inductance connections VL1, VL2, VL3, VL4 and one of the high-resistance, low-inductance connections VR1, VR2, VR3, VR4. Here, the first high-resistance, low-inductance connection VR1 is connected parallel to the second high-resistance, low-inductance connection VR2, the first low-resistance, high-inductance connection VL1 is connected parallel to the second low-resistance, high-inductance connection VL2, the third high-resistance, low-inductance connections VR3 are connected parallel to the fourth high-resistance, low-inductance connections VR4, and the third low-resistance, high-inductance connections VL3 are connected parallel to the fourth low-resistance, high-inductance connections VL4.

In particular, the four low-resistance, high-inductance connections VL1, VL2, VL3, VL4 are separate from one another and are essentially disjoint from one another, namely on the basis of the components that dominate their electrical properties. Likewise, however independently thereof, the high-resistance, low-inductance connections VR1, VR2, VR3, VR4 VL4 can, in the same way, be separate from one another and essentially disjoint from one another, namely on the basis of the components that dominate their electrical properties.

A direct voltage $U_{DC}$ is present across each one of the current bars 31a, 31b of the first current bar pair 31 and one of the current bars 32a, 32b of the second current bar pair 32. This direct voltage $U_{DC}$ feeds the switching devices, which are not drawn in, in an operating state in which the modular intermediate circuit in a converter circuit is used to produce an alternating voltage. At an AC output of the switching device, it is possible to tap an alternating voltage. In another operating state, the converter circuit can also conversely produce a direct voltage from an alternating voltage.

The modular intermediate circuit in FIG. 9 is set up so that every current-carrying conductor has another current-carrying conductor arranged spatially adjacent to it, whose current direction is opposite that of the first conductor. This minimizes the size of the conductor loops and reduces the inductance. Therefore, the converter circuit can also be geometrically implemented in a converter in the same way. The part of the circuit that would correspond to a power phase module 10 of a converter is sketched in the same way in FIG. 9, the switching device not being drawn in.

Figure 10:
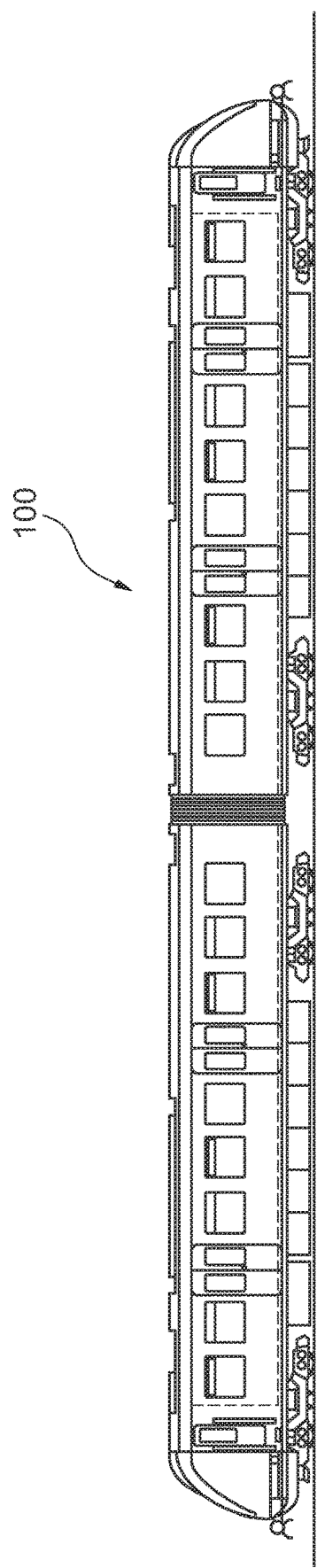
FIG. 10 shows a rail vehicle according to one embodiment.

FIG. 10 shows a rail vehicle 100 according to one embodiment. Here, the converter circuit can be connected in such a way with an energy converter, in particular a traction motor, to convert electrical energy into kinetic energy or vice versa, that the energy converter is connected with at least one of the first AC terminals of one of the switching devices. Besides the traction motor, it is also possible, for example, for the on-board electronic system or a regenerative brake to be connected with the converter circuit through an AC terminal of a switching device that is connected with it.

The above-described embodiments can be combined with one another in any way, for example the intermediate circuit capacitor modules 30 of FIGS. 7 and 8 can also have multiple intermediate circuit capacitors.

Even though specific embodiments have been presented and described here, it is within the scope of this invention to modify the embodiments shown in a suitable manner, without departing from the scope of protection of this invention. The following claims represent a first, non-binding attempt at defining the invention in general terms.

The invention claimed is:

1. A modular intermediate circuit for a power converter, the modular intermediate circuit comprising:
   at least two intermediate circuit capacitor modules connected in parallel and in a chain, each intermediate circuit capacitor module having:
      a first terminal,
      a second terminal, and
      at least one first intermediate circuit capacitor which is electrically connected with the first terminal and the second terminal,
   wherein:
      the first terminals of the at least two intermediate circuit capacitor modules each following immediately one after another in the chain are connected in each case through a first low-resistance, high-inductance connection and a first high-resistance, low-inductance connection that is connected in parallel thereto, and
      the second terminals of the at least two intermediate circuit capacitor modules each following immediately one after another in the chain are connected in each case through a second low-resistance, high-inductance connection and a second high-resistance, low-inductance connection that is connected in parallel thereto.

2. The modular intermediate circuit according to claim 1, wherein the at least two intermediate circuit capacitor modules is at least three intermediate circuit capacitor modules that are connected in parallel and in a chain.

3. The modular intermediate circuit according to claim 1, wherein an inductance of the first low-resistance, high-inductance connections and the second low-resistance, high-inductance connections is higher by at least a factor of 2 than an inductance of the first high-resistance, low-inductance connections and the second high-resistance, low-inductance connections.

4. The modular intermediate circuit according to claim 1, wherein a module of the modular intermediate circuit can be described in an equivalent circuit diagram as a quadrupole, the modules being connected as a chain conductor, and the equivalent circuit diagram of the quadrupole being formed by a low-resistance, high-inductance R-L component connected in series with the quadrupole and a high-resistance, low-inductance R-L component connected in parallel therewith, and a C component connected in parallel with the quadrupole, the C component being formed by an intermediate circuit capacitor module;
the low-resistance, high-inductance R-L component being formed by the first and the second low-resistance, high-inductance connection; and
the high-resistance, low-inductance R-L component being formed by the first and the second high-resistance, low-inductance connections.

5. The modular intermediate circuit according to claim 1, wherein an ohmic resistance of the first high-resistance, low-inductance connection and the second high-resistance, low-inductance connection is in the range from 0.1·Ropt to 10·Ropt where Ropt=√{square root over (L/C)} and where L is an inductance of the first low-resistance, high-inductance connection or the second low-resistance, high-inductance connection and C is a capacitance of at least one of the at least two intermediate circuit capacitor modules.

6. The modular intermediate circuit according to claim 1, wherein the modular intermediate circuit is designed for voltages of at least 1 kV across the first terminal of the at least two intermediate circuit capacitor modules and the second terminal of the at least two intermediate circuit capacitor modules.

7. The modular intermediate circuit according to claim 1, wherein at least one of the at least two intermediate circuit capacitor modules additionally has a second intermediate circuit capacitor that is connected in parallel with the first intermediate circuit capacitor.

8. The modular intermediate circuit according to claim 1, wherein
the first terminals of the at least two intermediate circuit capacitor modules each following immediately one after another in the chain are connected in each case through a third low-resistance, high-inductance connection,
the second terminals of the at least two intermediate circuit capacitor modules each following immediately one after another in the chain are connected in each case through a fourth low-resistance, high-inductance connection.

9. The modular intermediate circuit according to claim 1, wherein
the first terminals of the at least two intermediate circuit capacitor modules each following immediately one after another in the chain are connected through a third high-resistance, low-inductance connection; and
the second terminals of the at least two intermediate circuit capacitor modules each following immediately one after another in the chain are connected through a fourth high-resistance, low-inductance connection.

10. The modular intermediate circuit according to claim 1, wherein each of the at least two intermediate circuit capacitor modules additionally has a third terminal and a fourth terminal, and wherein
the third terminals of the at least two intermediate circuit capacitor modules each following immediately one after another in the chain are connected through a third high-resistance, low-inductance connection, and
the fourth terminals of the at least two intermediate circuit capacitor modules each following immediately one after another in the chain are connected through a fourth high-resistance, low-inductance connection.

11. The modular intermediate circuit according to claim 1, wherein each of the at least two intermediate circuit capacitor modules additionally has a third terminal and a fourth terminal, and
wherein the third terminals of the at least two intermediate circuit capacitor modules each following immediately one after another in the chain are connected in each case through a third low-resistance, high-inductance connection and a third high-resistance, low-inductance connection that is connected in parallel thereto,
the fourth terminals of the at least two intermediate circuit capacitor modules each following immediately one after another in the chain are connected in each case through a fourth low-resistance, high-inductance connection and a fourth high-resistance, low-inductance connection that is connected in parallel thereto.

12. A converter circuit comprising:
the modular intermediate circuit according to claim 1; and
at least two switching devices, each switching device comprising at least one DC terminal pair and at least one first AC terminal, wherein each switching device is associated with exactly one intermediate circuit capacitor module, and wherein the at least one DC terminal pair of each switching device is connected in parallel with the associated one intermediate circuit capacitor module.

13. The converter circuit according to claim 12, wherein the converter circuit is designed so that an electric current of at least 500 A can flow in an operating state from a DC terminal pair to at least one first AC terminal of a switching device of the at least two switching devices.

14. An energy converter connected with the converter circuit according to claim 12, wherein at least one first AC terminal of a switching device of the at least two switching devices is connected with the energy converter.

15. A vehicle comprising an energy converter configured to convert electrical energy into kinetic energy or vice versa, wherein the energy converter is connected with the converter circuit according to claim 12 in such a way that the energy converter is connected with at least one first AC terminal of one switching device of the at least two switching devices.

16. A modular intermediate circuit for a power converter, the modular intermediate circuit comprising:
at least two intermediate circuit capacitor modules connected in parallel and in a chain, each intermediate circuit capacitor module having:
a first terminal,
a second terminal, and
at least one first intermediate circuit capacitor which is electrically connected with the first terminal and the second terminal of the intermediate circuit capacitor module;

wherein:
- the first terminals of the at least two intermediate circuit capacitor modules each following immediately one after another in the chain are connected in each case through a first low-resistance, high-inductance connection and a first high-resistance, low-inductance connection, and
- the second terminals of the at least two intermediate circuit capacitor modules each following immediately one after another in the chain are connected in each case through a second low-resistance, high-inductance connection and a second high-resistance, low-inductance connection; and
- wherein the first low-resistance, high-inductance connection is connected in parallel to the second low-resistance, high-inductance connection; and
- wherein the first high-resistance, low-inductance connection is connected in parallel to the second high-resistance, low-inductance connection.

* * * * *